May 21, 1946.  D. W. PETERSON  2,400,597
STANDING WAVE INDICATOR FOR RADIO FREQUENCY TRANSMISSION LINES
Filed Oct. 6, 1943
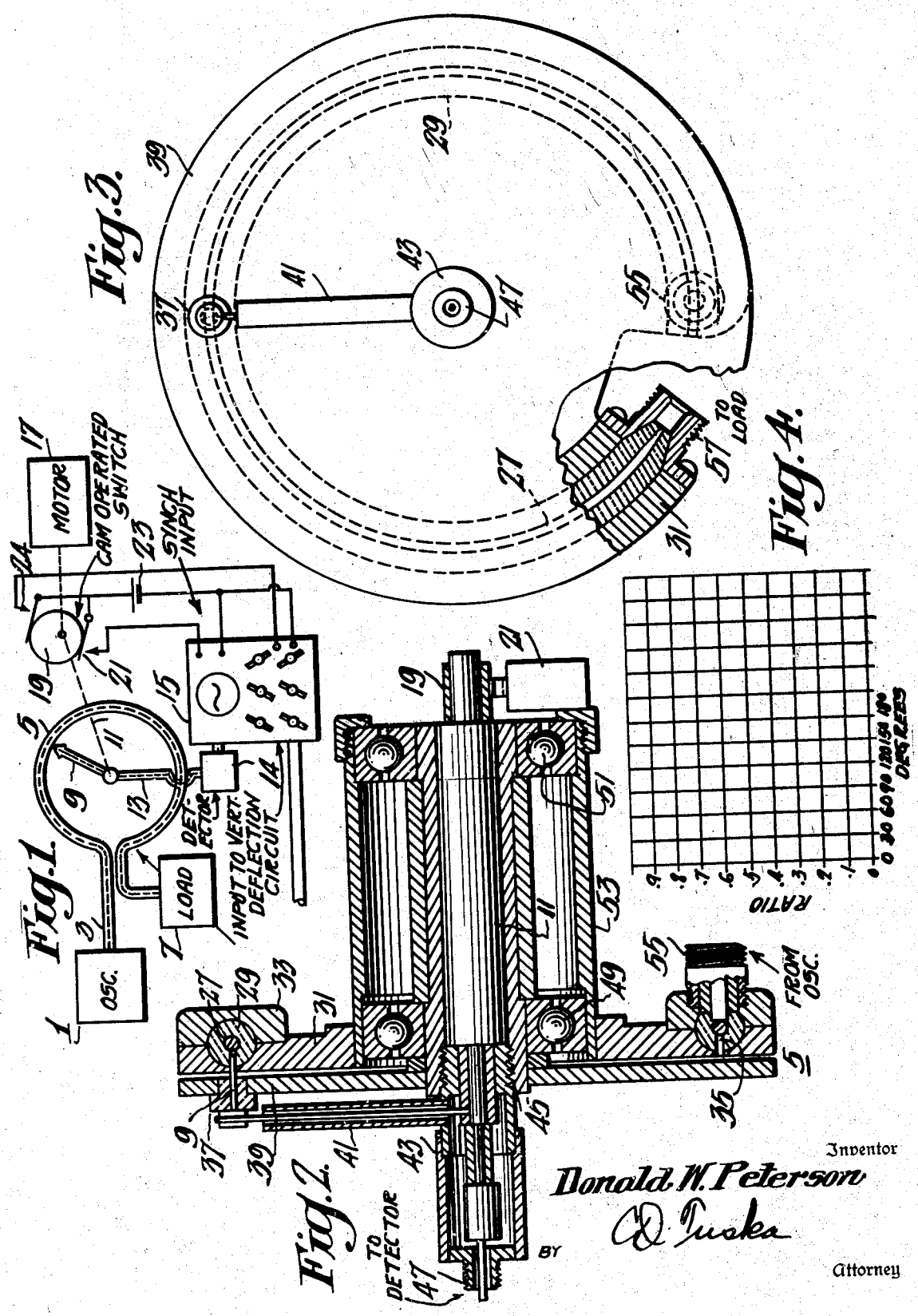
Inventor
Donald W. Peterson
BY
Attorney Patented May 21, 1946

2,400,597

UNITED STATES PATENT OFFICE 2,400,597

STANDING WAVE INDICATOR FOR RADIO-FREQUENCY TRANSMISSION LINES

Donald W. Peterson, Princeton, N. J., assignor to Radio Corporation of America, a corporation of Delaware Application October 6, 1943, Serial No. 505,252

6 Claims. (Cl. 171—95)

This invention relates to improvements in the art of adjusting radio frequency power networks, and more particularly to a standing wave indicator system for radio frequency transmission lines.

Radio frequency power transmission networks, such as are used in radio transmitting systems and the like, require relatively accurate adjustment, usually at several points, of the impedances presented at said points by the component transmission lines, both in order to avoid useless dissipation of energy and to provide proper division of power between several load elements, for example the radiators of a directive antenna. Resonant transmission line "stubs" are employed as reactive circuit elements, particularly at ultrahigh frequencies. Such reactive elements, connected at the proper points in a network, and adjusted to lengths so that they present the correct reactances at said points, are among the means employed to secure optimum performance and efficiency of the network, in accordance with principles well known to those skilled in the art.

It is substantially universal practice to obtain the information required for the determination of points of connection and line lengths by means of measurements of the so-called standing wave ratio in a transmission line carrying energy to or from the point in the network at which the impedance is to be adjusted. Usually for this purpose a special measuring line is employed comprising a transmission line section constructed so that measurements of the voltage across it at any point may be made readily.

The measuring line is inserted in the network in series with the line on which the standing wave ratio is to be determined. The characteristic impedance of the measuring line will usually be the same as that of the line to which it is connected, and the length must be at least enough so that the voltage along the line varies from its minimum to its maximum value. The ratio of the minimum value to the maximum is the standing wave ratio, and is unity when there is no standing wave, indicating no reflection and hence an impedance match. The positions of voltage nodes and loops on the measuring line correspond to those of similar nodes and loops on the measured line, affording indication of impedance at any point along the line and hence an indication of where stubs may be connected.

In prior art practice standing wave measurements have been made by means of a vacuum tube voltmeter connected to a probe which is inserted in the measuring line at various points along its length, the voltage at each point being noted by the operator to determine the magnitude, or ratio, and the position of the standing wave. While accurate adjustment may be attained by this method, it is extremely tedious when applied to complex networks, or when a large number of networks are to be adjusted.

It is the principal object of the present invention to provide an improved method of and means for standing wave indication.

Another object is to provide a standing wave indicator system providing a complete picture on the screen of a conventional cathode ray oscilloscope, thus avoiding the necessity for tedious and repetitive voltage measurements.

These and other objects will become apparent to those skilled in the art upon consideration of the following description, with reference to the accompanying drawing, of which Fig. 1 is a schematic diagram of a standing wave indicator system according to the invention, Fig. 2 is a longitudinal section including the probe and support structure of a folded measuring line employed in the system of Fig. 1, Fig. 3 is an end view of the structure of Fig. 2, and Fig. 4 illustrates a scale calibration for providing direct indication of standing wave ratio and impedance angle.

Referring to Fig. 1, a radio frequency oscillator 1 is coupled through a coaxial transmission line 3 and a measuring line 5 to a load circuit 7. By way of example, the oscillator 1 may be a radio transmitter, and the load device 7 may be an antenna system. The standing wave on the line 3 is to be indicated.

The measuring line 5 is essentially a transmission line section, having the same characteristic impedance as the line 3, bent into a circular configuration. The line 5 is provided with a slotted outer conductor, through which a probe 9 extends to or near the inner conductor. The probe 9 is supported on a shaft 11 and coupled to a line 13 which is connected through a detector 14 to the vertical deflection circuit of a conventional cathode ray oscilloscope 15. The shaft 11 is coupled to a motor 17 and carries a cam 19 for cooperation with a switch 21. The switch 21 is connected in series with a battery 23 to the synchronizing voltage input circuit of the oscilloscope 15. A second switch 24, similar to the switch 21 but angularly adjustable with respect to the cam 19, is connected between the battery 23 and the intensity control circuit of the oscilloscope 15. The mechanical details of the line 5 and the associated structure are described more fully hereinbelow.

The operation of the above-described system is as follows: The motor 17 rotates the cam 19 and the probe 9, by means of the shaft 11. The cam 19 closes the switch 21 momentarily once during each revolution of the shaft 11, providing horizontal sweep synchronizing impulses for the oscilloscope 15. As the probe 9 rotates, the voltage picked up by it and applied through the line 13 to the oscilloscope 15 varies in accordance with the standing wave on the line 5. This voltage, amplified by the usual vertical deflection amplifier in the oscilloscope 15, causes the cathode ray beam to move vertically from its undeflected position at the same time as it is moved horizontally by the linear sweep circuit in response to the synchronizing pulses. Thus the position of the cathode ray spot on the screen of the oscilloscope is at every instant determined by the position of the probe 9 along the line 5, and the voltage on the line 5 at that position. Owing to optical and screen persistence effects, the appearance of a continuous curve, corresponding to the voltage distribution along the line 5, is presented.

To facilitate measurements of standing wave ratio and impedance angles, a transparent scale, calibrated as shown in Fig. 4, may be placed over the screen of the oscilloscope 15. The vertical deflection gain and centering controls are adjusted so that the cathode ray pattern fills the vertical scale. Since the voltage at the probe 9 becomes zero as the probe leaves one end of the line 5 to enter the other end, the deflection pattern zero is correctly set with respect to the vertical scale by this adjustment. The pattern maxima are set at 1, and the minimum, or maxima, occur at a vertical scale coordinate numerically equal to the standing wave ratio.

To read angles directly, for determining impedance, the load is short-circuited and the horizontal gain and centering controls of the oscilloscope 15 are adjusted so that the pattern minima occur at points 180° apart on the horizontal scale. The switch 24 is manually adjusted with respect to the cam 21 to provide a reference mark on the deflection pattern at a point corresponding to a voltage minimum with the load short-circuited. With the short circuit removed, the reference mark stays in the same position and the angle between it and the new minimum position is indicated.

Referring to Figs. 2 and 3 the line 5 includes an inner conductor 27 supported in a toroidal body 29 of insulating material such as styrene secured between a conductive disc 31 and an annular conductive member 33, in grooves of semi-circular section formed in the cooperating surfaces of the members 31 and 33. A circular groove 35 is cut through the members 29 and 31 to the inner conductor 27 to permit entrance of the probe 9. The probe 9 is supported in an insulator 37 extending through a disc 39 secured to the end of the shaft 11. A short coaxial line section 41 extends radially of the disc 39 between the probe 9 and a rotating joint 43. The joint 43 is secured to the end of the shaft 11 by screw threads 45, and is provided at its outer end with coupling means 47 for engagement with complementary means on the line 13 (Fig. 1). The shaft 11 is supported on bearings 49 and 51 in a conventional housing 53. The ends of the line 5 are provided with couplings 55 and 57 for connection to input and output lines (not shown) such as those leading to the oscillator 1 and the load 7 in Fig. 1.

The invention has been described as a standing wave indicator for R.-F. transmission lines. A slotted measuring line, bent to a circular shape, is connected to the line to be measured. A probe extends through the slot in the measuring line and is revolved so as to sweep repeatedly throughout the length of the line. The voltage at the probe is applied through detector means to the vertical deflection system of a cathode ray oscilloscope. The horizontal cathode ray sweep is synchronized with the probe sweep, providing a cathode ray scanning pattern corresponding to the standing wave on the measuring line. By means of a calibrated scale placed over the face of the oscilloscope, standing wave ratio and impedance angle may be indicated directly.

I claim as my invention:

1. A standing wave indicator system including a coaxial line with a slotted outer conductor, said line being curved to a substantially circular form whereby said slot lies in the circumference of a circle, a shaft extending normal to the plane of said circle and concentric therewith, probe means supported eccentrically on said shaft and extending through said slot, whereby rotation of said shaft causes said probe cyclically to sweep the length of said line, means for connecting a radio frequency source and a load to the respective ends of said line, a detector connected to said probe through means including a rotatable coaxial line coupling, a cathode ray oscilloscope including a vertical deflection circuit connected to said detector and a linear horizontal sweep circuit, a cam operated switch on said shaft, and a D.-C. source connected through said switch to said sweep circuit whereby said sweep circuit operates synchronously with the rotation of said shaft.

2. The invention as set forth in claim 1 including a second cam operated switch, adjustable angularly with respect to said shaft, and connected to an intensity control circuit of said oscilloscope to provide an adjustable reference index on the scanning pattern produced on the screen of said oscilloscope.

3. The invention as set forth in claim 1 including a transparent scale lying over the screen of said oscilloscope and calibrated vertically in terms of standing wave ratio and horizontally in terms of angular units.

4. A continuously direct indicating standing wave indicator system including a circular measuring line, a probe, means for continuously moving said probe along said line, detector means connected to said probe, and a cathode ray oscilloscope connected to said detector means.

5. The invention as set forth in claim 4 wherein said cathode ray oscilloscope includes a horizontal sweep circuit, and means for synchronizing the operation of said sweep circuit with the motion of said probe.

6. A continuously direct indicating standing wave indicator system including a circular slotted measuring line, a probe, means for continuously moving said probe along the slot in said line, detector means connected to said probe, and a cathode ray oscilloscope connected to said detector means.

DONALD W. PETERSON.